United States Patent
Sakazawa et al.

(10) Patent No.: US 7,991,183 B2
(45) Date of Patent: Aug. 2, 2011

(54) ELECTRONIC WATERMARK EDITOR FOR COMPRESSED VIDEO

(75) Inventors: Shigeyuki Sakazawa, Fujimino (JP); Yasuhiro Takishima, Fujimino (JP)

(73) Assignee: KDDI Corporation, Tokyo (JP)

( * ) Notice: Subject to any disclaimer, the term of this patent is extended or adjusted under 35 U.S.C. 154(b) by 1120 days.

(21) Appl. No.: 11/583,723

(22) Filed: Oct. 20, 2006

(65) Prior Publication Data

US 2007/0092106 A1    Apr. 26, 2007

(30) Foreign Application Priority Data

Oct. 21, 2005   (JP) ................. 2005-307036

(51) Int. Cl.
*G06K 9/00*    (2006.01)
(52) U.S. Cl. ...................................... 382/100
(58) Field of Classification Search ............ 382/100
See application file for complete search history.

(56) References Cited

U.S. PATENT DOCUMENTS 6,664,976 B2 * 12/2003 Lofgren et al. ............ 345/634

FOREIGN PATENT DOCUMENTS

JP    2002-135736    5/2002

OTHER PUBLICATIONS

Nakajima et al., "Rewritable Data Embedding on MPEG Coded Data Domain", IEEE, Jul. 2005.*

* cited by examiner

*Primary Examiner* — Vikkram Bali
*Assistant Examiner* — Katrina Fujita
(74) *Attorney, Agent, or Firm* — Westerman, Hattori, Daniels & Adrian, LLP (57) ABSTRACT

The present invention provides an electronic watermark editor for a compressed video that can efficiently carry out editing such as deletion or rewriting of electronic watermark data. DCT coefficient values are extracted while applying all templates to video contents, and a template where a total sum of relative absolute value differences between pairs of the DCT coefficient values is maximized is judged to be an applied template. The pairs of DCT coefficient values extracted by the applied template are processed by a smoothing process section so that the relative differences are reduced and so as to reduce individual relative differences recursively until significant differences between the coefficient value pairs are statistically eliminated. In addition, the pairs of DCT coefficient values extracted by the applied template are replaced with new editing bits.

6 Claims, 7 Drawing Sheets

ELECTRONIC WATERMARK EDITOR FOR COMPRESSED VIDEO

BACKGROUND OF THE INVENTION

1. Field of the Invention

The present invention relates to an electronic watermark editor for a compressed video that deletes already-inserted electronic watermark information or replaces the same with other information.

2. Description of the Related Art

Conventionally, for the purpose of indicating the source of a video and preventing distribution of pirated editions, a technique for embedding electronic watermark data in a video has been researched and developed. It is necessary for the electronic watermark data to have a large tolerance since this cannot play its original role if this is detected by other people or is removed. In addition, it is necessary for the electronic watermark data to allow a simple and accurate determination as to whether or not this has been embedded and to make a speedy detection.

As an example of a conventional video watermarking device that satisfies the above requirements, for example, a device shown in the following Patent Literature 1 exists. By the invention disclosed in this published application, a plurality of blocks is extracted from an image frame by use of a template, and blocks at two different positions are paired. And, one of the blocks is defined as a block for expressing a bit 0, and the other block, for expressing a bit 1, and according to a bit to be expressed, an absolute value of an appropriate DCT coefficient value of a block corresponding to the bit to be expressed is made larger than an absolute value of an appropriate DCT coefficient value of the other block.

[Patent Literature 1] Japanese Published Unexamined Patent Application No. 2002-135736

It becomes necessary to carry out editing such as deleting electronic watermark data embedded in the block pair of the conventional art described above so that a video excellent in image quality can be reproduced or rewriting the electronic watermark data to other watermark data, however, a problem that no proposal has been made for the editing has existed.

SUMMARY OF THE INVENTION

It is an object of the present invention to provide an electronic watermark editor of a compressed video that can efficiently carry out editing such as deletion or rewriting of electronic watermark data.

In order to accomplish the object, the first feature of the present invention is that an electronic watermark editor of a compressed video with an electronic watermark that expresses information by a relative difference between two DCT coefficient values, comprises a means for specifying a template to instruct on a block position used for a video when embedding an electronic watermark and a smoothing means for smoothing a relative difference between a pair of DCT coefficient values of a block instructed by the template, wherein the electronic watermarks are deleted by the smoothing means.

The second feature of the present invention is that the electronic watermark editor comprises a means for specifying a template to instruct on a block position used for a video when embedding an electronic watermark, a means for providing an electronic watermark editing bit to be newly embedded and a means for embedding the editing bit in a pair of DCT coefficient values of a block instructed by the template.

According to the present invention, it becomes possible to delete, from a video embedded with electronic watermark data, the watermark data by a simple manipulation. In addition, it becomes possible to reembed different watermark data in video contents from which watermark data has been deleted. In addition, when the video contents from which watermark data has been deleted are reproduced, it becomes possible to obtain a high-quality video image without noise.

Furthermore, according to the present invention, it becomes possible to rewrite watermark data that has already been embedded to editing bits by a simple manipulation. Therefore, it becomes possible to embed different electronic watermark data depending on delivery destinations in videos of identical contents.

DETAILED DESCRIPTION OF THE PREFERRED EMBODIMENTS

First, description will be given of embedding of electronic watermark data in a block pair, which is a presupposition of the present invention.

Figure 9:
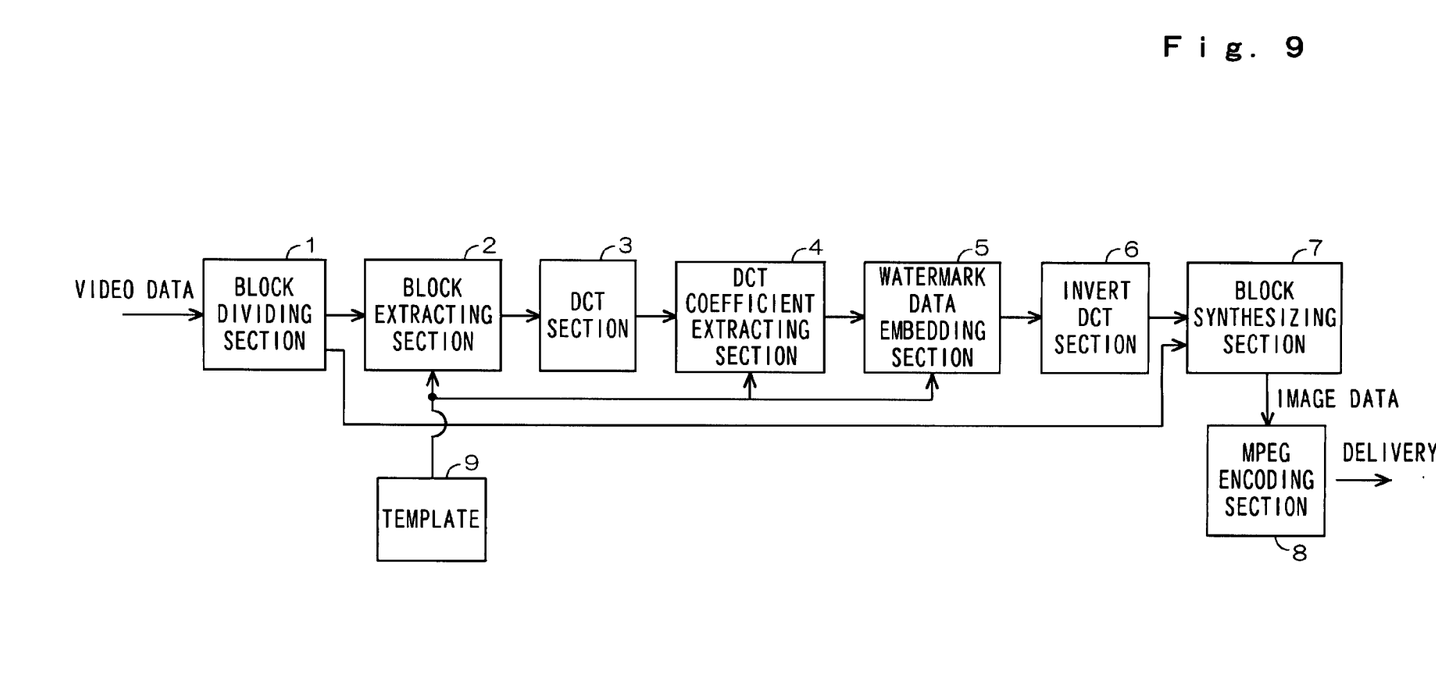
FIG. 9 is a block diagram showing a schematic configuration of a watermark embedded.

FIG. 9 shows an example of an electronic watermark embedder, wherein a block dividing section 1 divides an image frame into 8×8-pixel blocks. A block extracting section 2 extracts a plurality of macroblocks (16×16 pixels) instructed by a template 9. A DCT section 3 discrete-cosine-transforms (DCTs) each block contained in the macroblock, and a DCT coefficient extracting section 4 extracts a DCT coefficient x that exists at a position where a DCT coefficient exists in one of the blocks (one or the other of the block pair) in the DCTed macroblock. The position of a DCT coefficient x can be instructed by the template 9 or can be predetermined. A watermark data embedding section 5 embeds watermark data in the DCT coefficient x.

Figure 2:
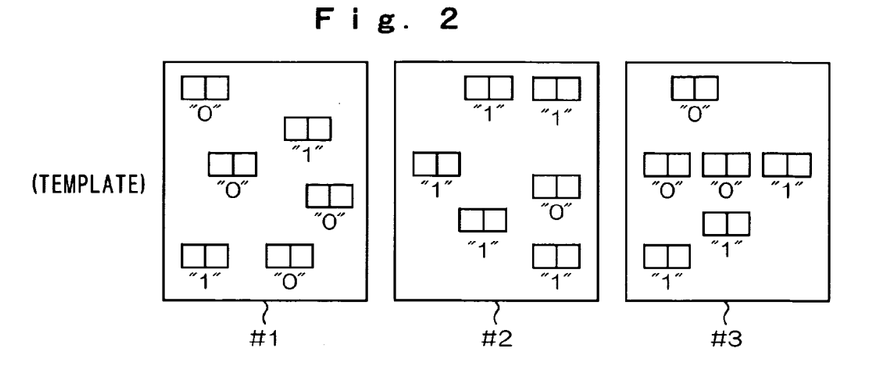
FIG. 2 is a conceptual diagram of templates.

Here, the template 9 is for providing positions in which watermark data is to be embedded, and therefore instructs the block extracting section 2 on extracting macroblocks and instructs the DCT coefficient extracting section 4 and watermark data embedding section 5 on positions of DCT coefficients of block pairs in which watermark data is to be embedded. However, when the positions of DCT coefficients x in the block pairs in which watermark data is to be embedded have been predetermined, instructions by the template 9 are unnecessary. A plurality of templates #1, #2, #3, . . . have been prepared in the template 9, and these are selected based on a specific rule or at random and applied to the block extracting section 2. Examples of the plurality of templates are shown in FIG. 2.

Figure 10:
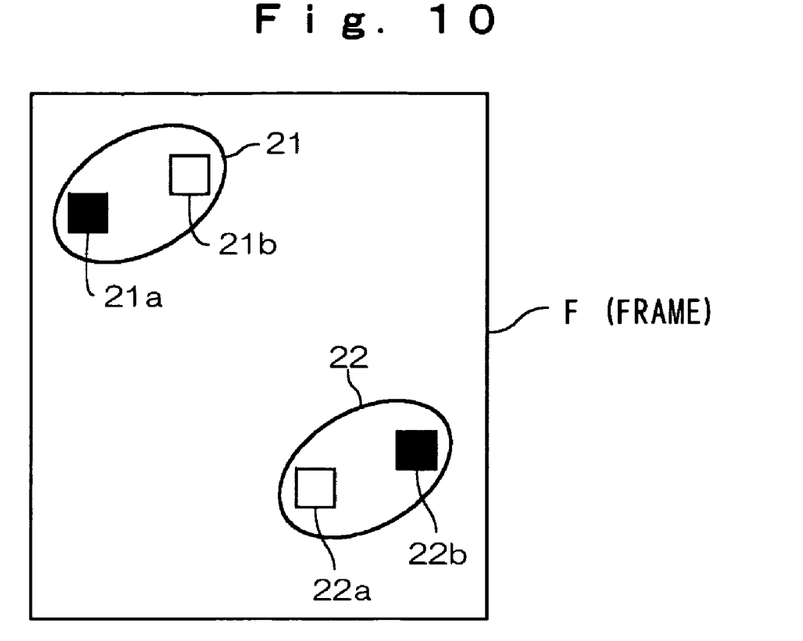
FIG. 10 is an explanatory view of an expression form of embedding information of bits which are embedded in a frame.

As a result, DCT block pairs extracted from an image frame are as shown in FIG. 10. In FIG. 10, reference numerals 21a, 21b, 22a, and 22b denote blocks each composed of 8×8 pixels, each of the block pairs 21a and 21b, 22a and 22b, etc. have a predetermined positional relationship, and for example, in the pairs, the blocks 21a and 22a located on the left indicate embedding DCT coefficients for a bit 0, and the blocks 21b and 22b located on the right indicate embedding DCT coefficients for a bit 1.

Therefore, when a bit 0 is embedded in the pair 21, watermark data is embedded in the DCT coefficient of the block 21a, but no watermark data is embedded in the block 21b. On the other hand, when information of a bit 1 is embedded in the pair 22, no watermark data is embedded in the block 22a, but watermark data is embedded in the block 22b. As a result, a magnitude correlation between the DCT coefficients of the pair embedded with a bit 0 is, for example, an absolute value of the DCT coefficient of the block 21a>an absolute value of the DCT coefficient of the block 21b, while a magnitude correlation between the DCT coefficients of the pair embedded with a bit 1 is, for example, the DCT coefficient of the block 22a>the DCT coefficient of the block 22b.

Figure 11:
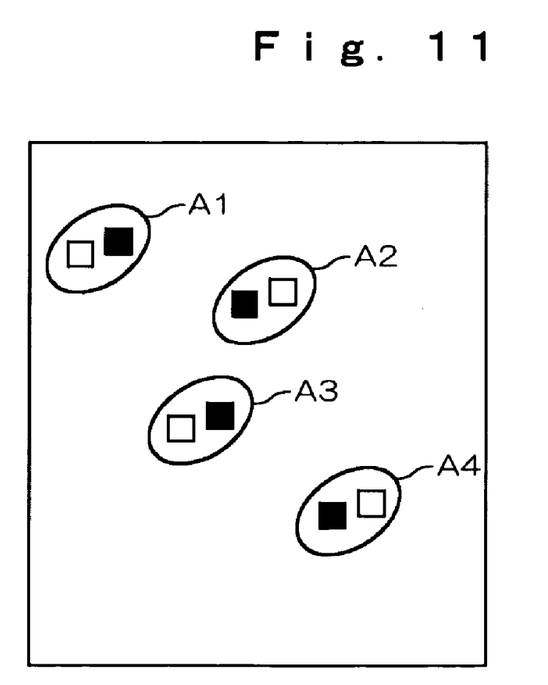
FIG. 11 is an explanatory view showing a large number of DCT coefficient value pairs with bit information embedded.

FIG. 11 is an example where pairs A1 to A4 in an image frame have been embedded with bits "1010", however, in actuality, watermark data of more bits, for example, approximately 80 bits per one image frame is embedded.

An invert DCT section 6 in FIG. 9 inverse-DCTs the blocks (macroblocks) embedded with watermark data. A block synthesizing section 7 synthesizes the inverse-DCTed blocks with blocks not extracted by the block extracting section 2 so as to generate image data embedded with watermark data. An MPEG encoding section 8 MPEG-encodes (quantizes and Huffman-encodes) the image data embedded with watermark data in order to create video contents to be distributed.

Figure 1:
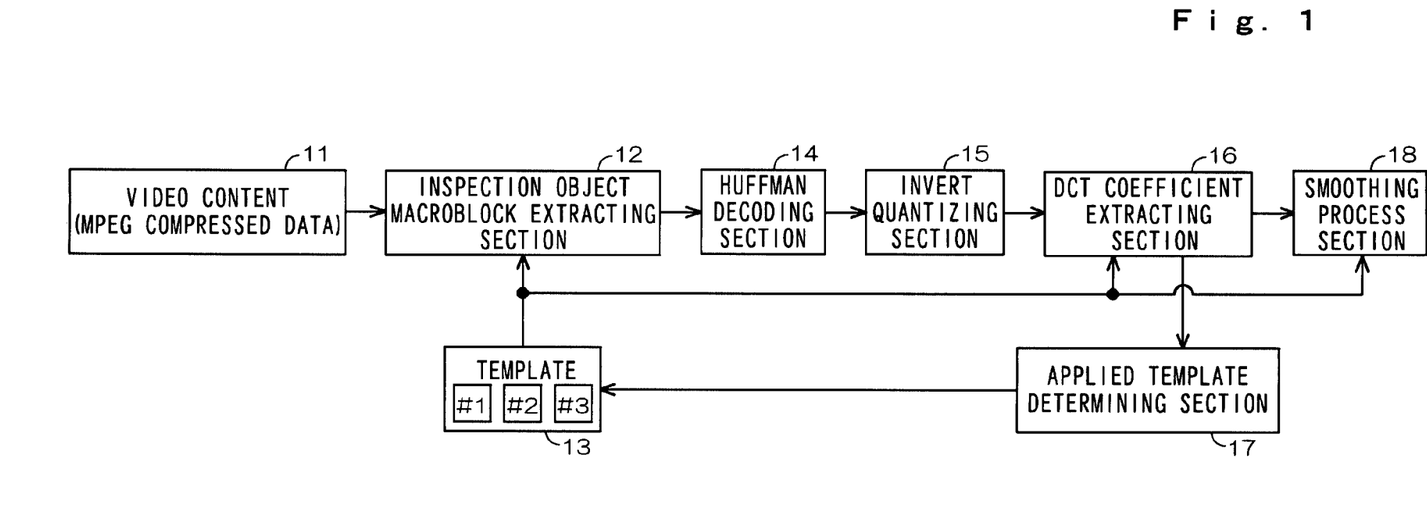
FIG. 1 is a block diagram showing a schematic configuration of an embodiment of the present invention.

An embodiment of the present invention for editing, for example, deleting watermark data from the compressed video data including watermark data obtained as in the above will be described below. FIG. 1 is a block diagram showing a schematic configuration of a device that deletes watermark data.

In a template 13, the same templates #1, #2, #3, . . . as those used when embedding watermark data (the same as the template 9 of FIG. 9) have been prepared. Video contents 11 from which watermark data needs to be deleted are in a state of MPEG compressed data, and macroblocks in which watermark data has already been embedded are extracted by an inspection object macroblock extracting section 12.

In order to detect which of the plurality of templates #1, #2, and #3, . . . in the template 13 has been used to apply a watermark data embedding process to each frame of the video contents 11, in the inspection object macroblock extracting section 12, macroblocks are extracted by applying the plurality of templates #1, #2, #3, . . . in the template 13 one by one to each frame of the video contents. FIG. 2 is a conceptual diagram of the plurality of templates #1, #2, and #3. For the individual templates #1, #2, and #3, positions of macroblocks and DCT coefficients embedded with watermark data, and if necessary, bits (1 or 0) have been designated.

Now, assuming that macroblocks have been extracted by applying the template #1, the macroblocks are Huffman-decoded by a Huffman decoding section 14 and are next inverse-quantized by an invert quantizing section 15. The inverse-quantized DCT coefficients are sent to a DCT coefficient extracting section 16, from which pairs of DCT coefficients (DCT coefficients for bits 0 and 1) embedded with watermark data are extracted. The extracted DCT coefficients are sent to an applied template determining section 17, and a sum total of absolute value differences between DCT coefficient values of the respective pairs are determined. When a sum total of absolute value differences has been determined for the template #1, the template 13 applies the next template #2 to the inspection object macroblock extracting section 12 to carry out the same operations as described above, and the applied template determining section 17 determines a sum total of absolute value differences for the template #2. Hereinafter, for the remaining template #3, . . . as well, the same operations as those described above are carried out.

When an applied template has matched, since all of the pairs extracted by the template have been intentionally manipulated, the sum total of absolute value differences of the pairs determined by the applied template determining section 17 is large, while when it has not matched, since the extracted pairs have not been intentionally manipulated, the sum total of absolute value differences is small. Thus, the applied template determining section 17 determines a template when the sum total of absolute value differences of the pairs is the largest as the applied template.

Alternatively, the applied template determining section 17 may determine the best match template for each video frame, so as to give largest value for a total sum of relative absolute value differences, relative square value differences, etc. between pairs of the DCT coefficient value.

Figure 3:
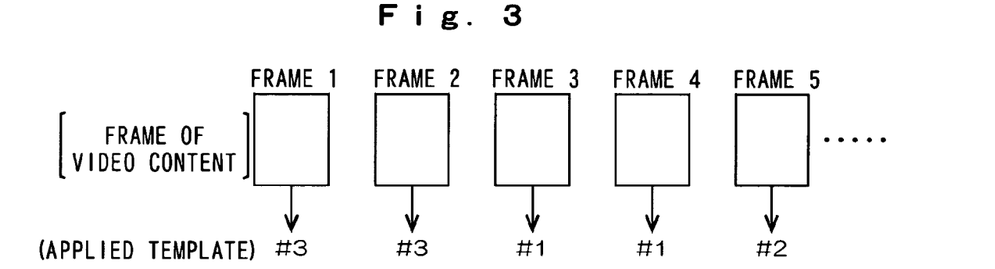
FIG. 3 is a conceptual diagram of applied templates that have been detected.

By carrying out the above operations for each frame of the video contents, applied templates #3, #3, #1, #1, #2, . . . to the respective frames 1, 2, 3, 4, 5, . . . are determined as shown in FIG. 3.

The DCT coefficient extracting section 16 sends the DCT coefficients extracted by use of the applied template determined as described above to a smoothing process section 18. Operations of an example of the smoothing process section 18 will be described with reference to a flowchart of FIG. 4.

Figure 4:
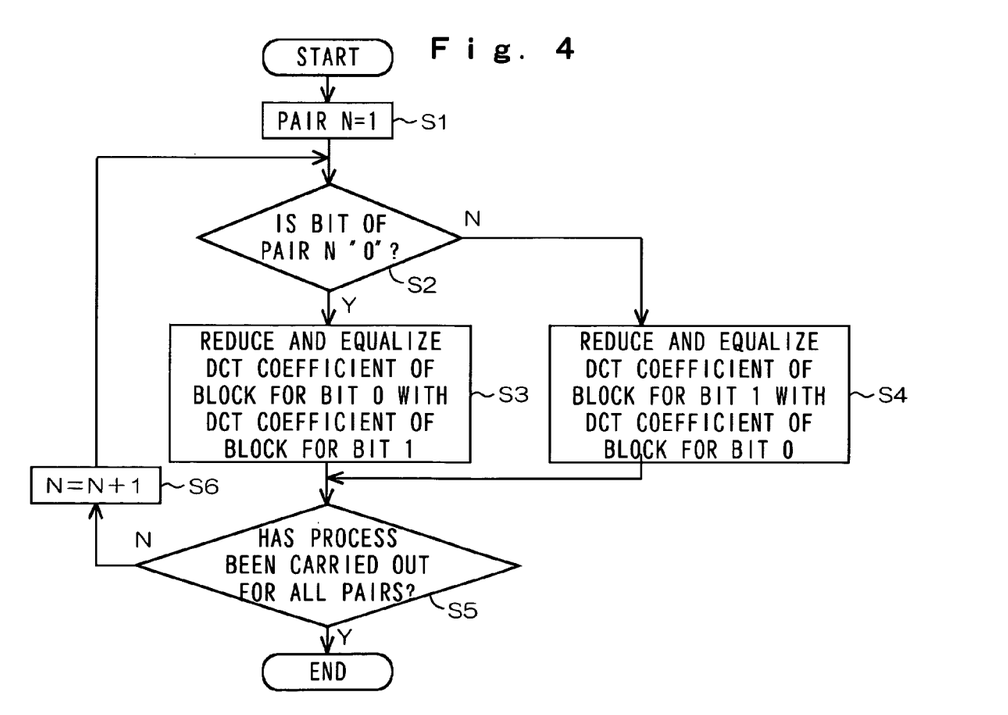
FIG. 4 is a flowchart showing operations of an example of the present invention.

In step S1, a provision number N that stands for a number of the pair is provided as 1. In step S2, a judgment is made as to whether or not a bit of the N-th pair is "0." When it is judged "0," the process proceeds to step S3, wherein the DCT coefficient value of a block for a bit 0 is reduced and equalized with the DCT coefficient value of a block for a bit 1. On the other hand, when it is judged "1," the process proceeds to step S4, wherein the DCT coefficient value of a block for a bit 1 is reduced and equalized with the DCT coefficient value of a block for a bit 0. After the process in step S3 or S4 has ended, the process proceeds to step S5, wherein a judgment is made as to whether or not the process has ended for all pairs, and when the judgment is negative, the process proceeds to step S6, wherein 1 is added to N. Next, the process returns to step S2, wherein the operations are repeated. When the judgment in step S5 has become positive as a result of the operations being repeated, the process is ended.

By the above process, the DCT coefficient values in each of all pairs are equalized, and this means that the watermark data has been deleted. Here, why the larger DCT coefficient value has been reduced in steps S3 and S4 is because noise that appears in an image is generally large when the DCT coefficient value is large, and reduction in the larger DCT coefficient value allows reducing the noise more.

Figure 5:
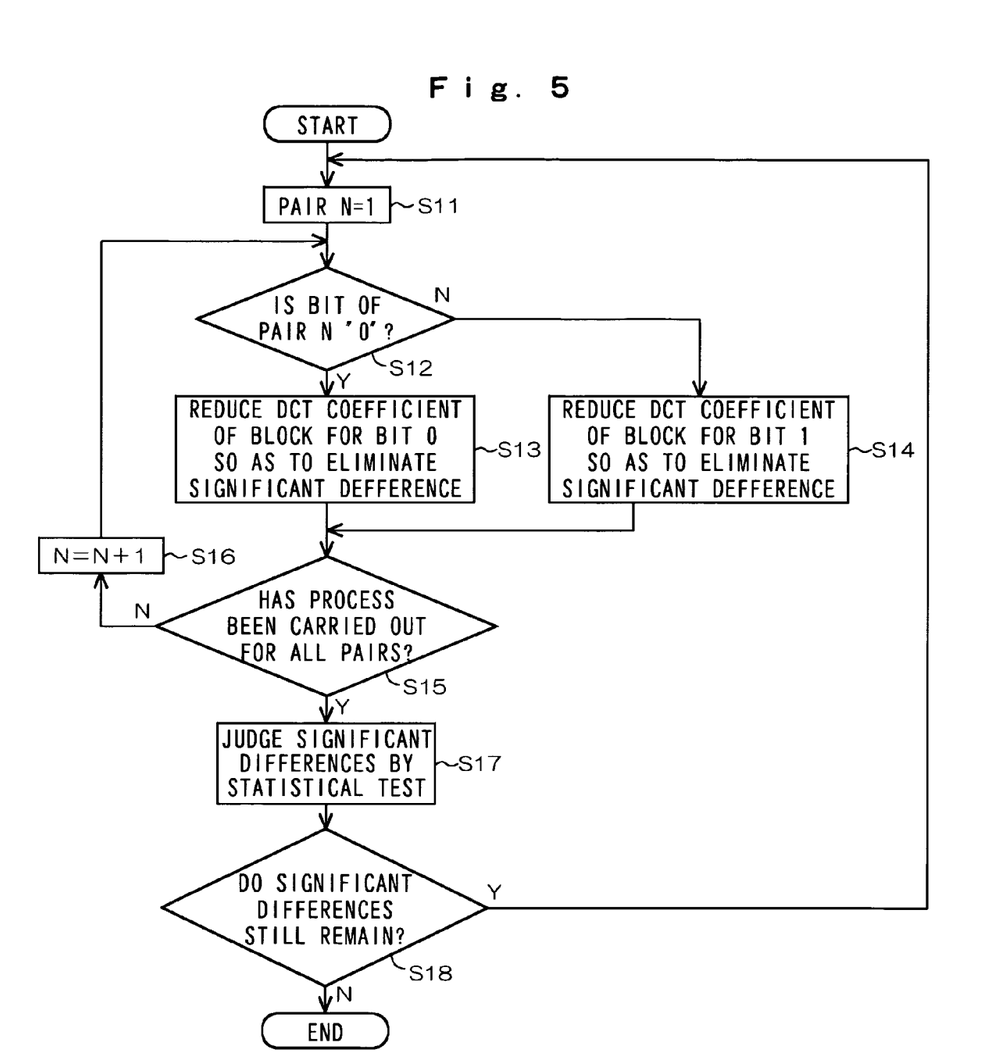
FIG. 5 is a flowchart showing operations of another example of the present invention.

Next, operations of another example of the smoothing process section 18 will be described with reference to a flowchart of FIG. 5.

Description of Steps S11 and S12 will be omitted since these are the same as steps S1 and S2 of FIG. 4. In step S12, when it is judged that a bit of the N-th pair (pair N) is "0", the process proceeds to step S13, wherein the DCT coefficient value of a block for a bit "0" is reduced so as to eliminate a significant difference. On the other hand, when it is judged "1," the process proceeds to step S14, wherein the DCT coefficient value of a block for a bit "1" is reduced so as to eliminate a significant difference. Here, "eliminate a significant difference" means that a difference between the DCT coefficient values of a pair is so small as to be permissible.

Alternatively, in step S12, one or both of the DCT coefficient values of the N-th pair may be reduced on the basis of only their large and small relation so as to eliminate a difference between them, without judging that the bit of the N-th pair is "0" or "1".

In step S15, a judgment is made as to whether or not the process has been carried out for all pairs, and when the judgment is negative, the process proceeds to step S16, wherein 1 is added to N, and the operations in steps S12 to S16 are repeated. When the judgment in step S15 has become positive as a result of the above operations, the process proceeds to step S17, wherein significant differences of the pairs 1 to N are statistically judged by a statistical test (for example, a t-test). In step S18, it is judged as to whether the significant differences still remain, and when the significant differences remain, the process returns to step S11, wherein the operations are repeated again. When the significant differences have been eliminated, that is, when no pairs have significant differences, the judgment in step S18 becomes negative, and the smoothing process is ended.

In this process as well, the watermark data that has been embedded in all pairs is substantially deleted.

When the smoothing process has ended, next, in order to prevent the change in the DCT coefficient values caused by the watermark deletion from propagating to the following frames, drift control is carried out. Concretely, temporal propagation of the DCT coefficient values is suppressed by inversely manipulating DCT coefficient values of blocks at identical positions in the following frames. For details, since the drift compensation method of Japanese Published Unexamined Patent Application No. 2005-142898 by the present applicant can be applied, detailed description thereof will be omitted.

According to the present embodiment, since watermark data can be efficiently deleted, it becomes possible to reembed different watermark data in video contents from which the watermark data has been deleted. In addition, when the video contents from which the watermark data has been deleted are reproduced, a high-quality video image without noise can be obtained.

Next, description will be given of an electronic watermark editing process, which is another embodiment of the present invention. This editing process means to change watermark data that has already been embedded to other watermark data.

Figure 6:
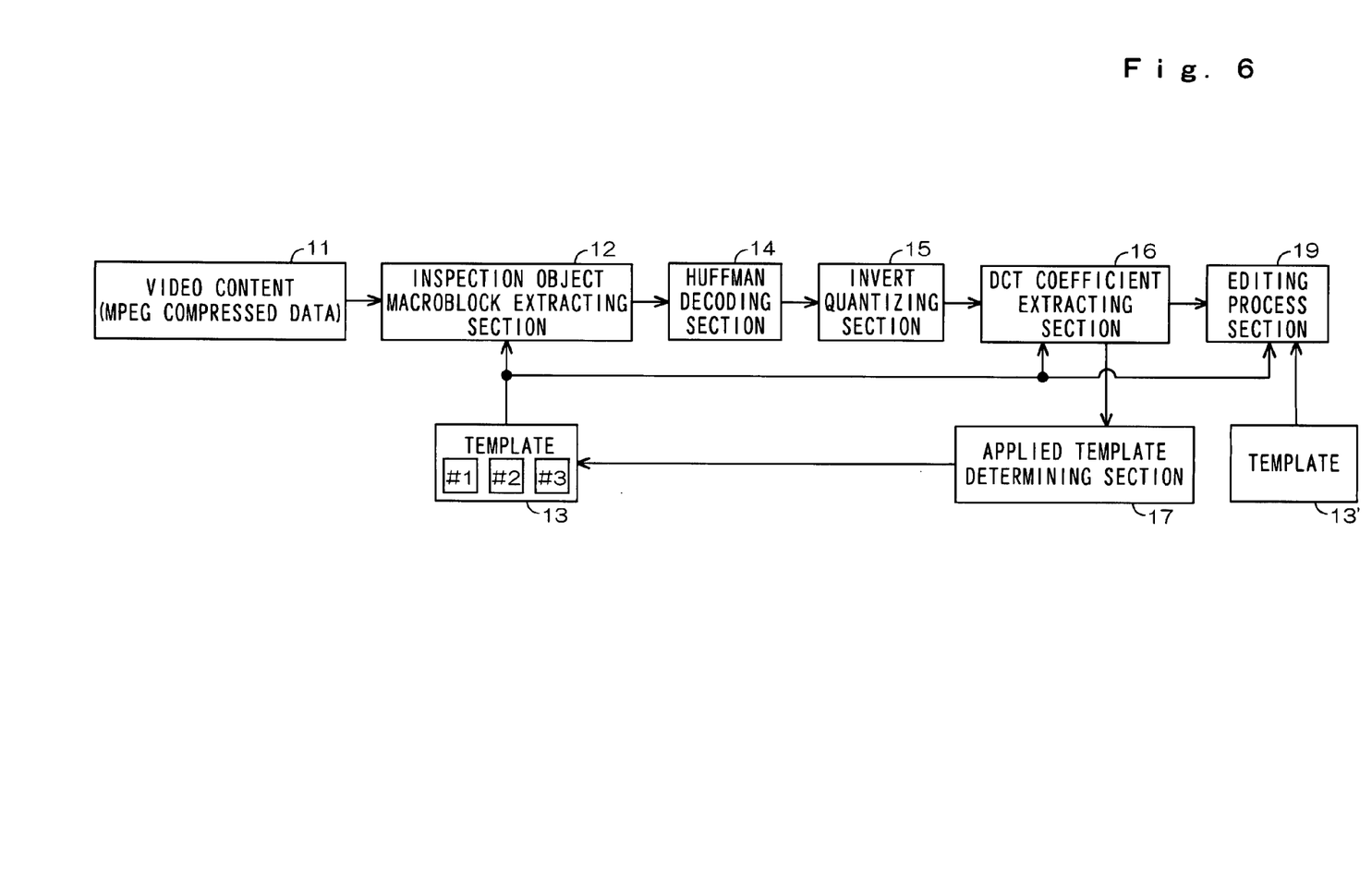
FIG. 6 is a block diagram showing a schematic configuration of another embodiment of the present invention.

A schematic configuration of the present embodiment is shown in FIG. 6. In FIG. 6, the same reference numerals as those in FIG. 1 denote identical or equivalent components. In a template 13', although the pair positions are the same as those in the template 13, it is provided that bits (hereinafter, referred to as "editing bits") that are newly embedded in the pair positions have been stored.

Figure 7:
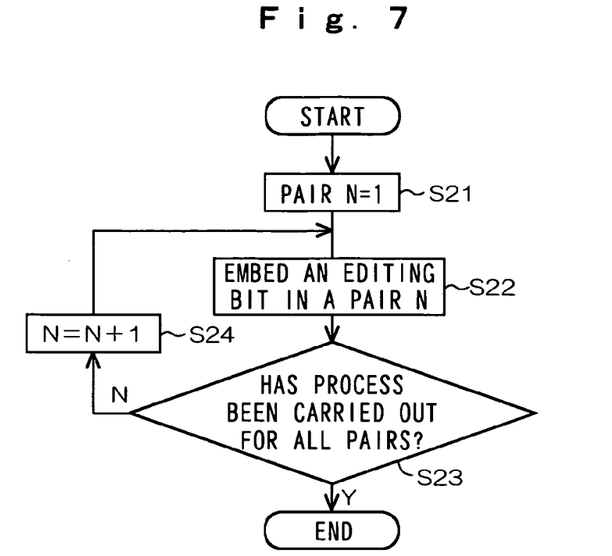
FIG. 7 is a flowchart showing operations of an example of the present invention.

The process proceeds to step S22 after N=1 is provided in step S21, and in step S22, an editing bit is embedded in a pair N. In step S23, a judgment is made as to whether or no the process to embed an editing bit has ended for all pairs, and when the judgment is negative, the process proceeds to step S24, wherein 1 is added to N. Next, the process returns to step S22, wherein a process to embed an appropriate editing bit in the (N+1)-th pair is carried out. When the judgment in step S23 has become positive as a result of the above process being repeatedly carried out, the process is ended.

According to this embodiment, watermark data that has already been embedded can be rewritten to other watermark data by a simple manipulation.

Next, operations of another example of the present embodiment will be described with reference to a flowchart of FIG. 8. In the example, it is provided that a watermark data detecting section (unillustrated) follows the DCT coefficient extracting section 16 of FIG. 6 and whether the bit of each pair is 1 or 0 has been known.

Figure 8:
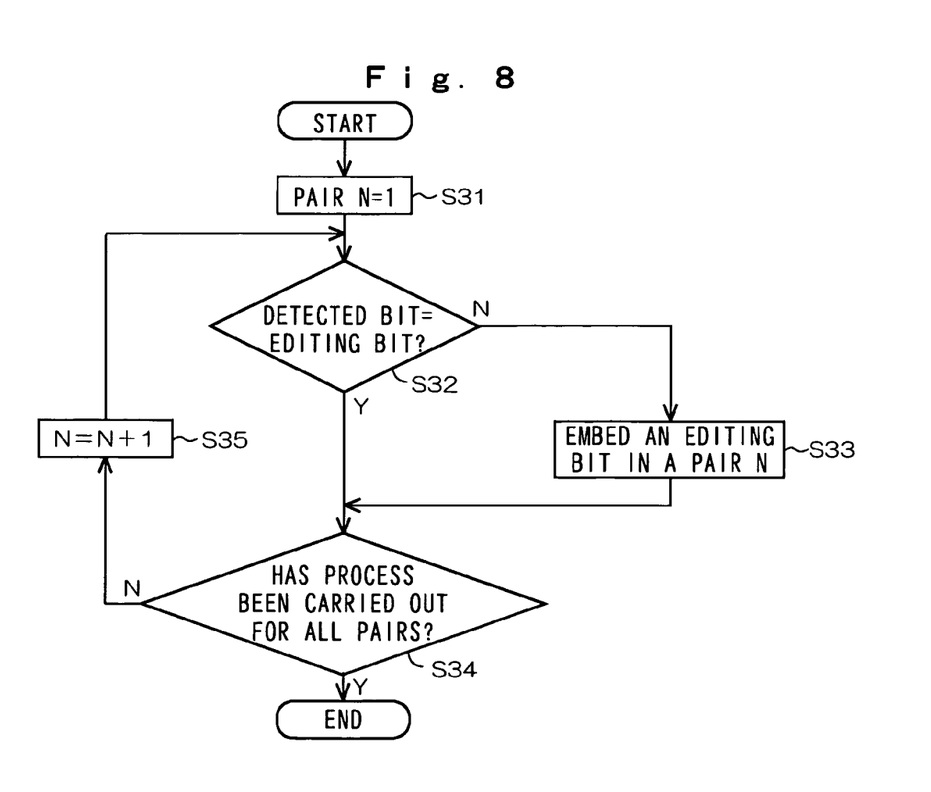
FIG. 8 is a block diagram showing a schematic configuration of another embodiment of the present invention.

Therefore, after N=1 is provided in step S31 of FIG. 8, in step S32 of FIG. 8, a judgment is made as to whether or not a bit (detected bit) of the N-th pair detected by the watermark data detecting section is equal to an editing bit instructed by the template 13'. When these are equal, the process skips step S33 and proceeds to step S34. On the other hand, when these are different, the process proceeds to step S33, wherein an editing bit is embedded in the pair N. In step S34, a judgment is made as to whether or not the process has been carried out for all pairs, and when the judgment is negative, the process proceeds to step S35, wherein 1 is added to N. When the judgment in step S34 has become positive as a result of the above process being repeatedly carried out, the process is ended.

In this example, instead of forcedly embedding editing bits in all pairs as in the example of FIG. 7, when the editing bit is different from the detected bit, the editing bit is embedded in that pair. Consequently, the number of pairs to be manipulated is reduced, so that a bad influence on image quality can be suppressed to the minimum.

What is claimed is:

1. An electronic watermark editor of a compressed video with an electronic watermark that expresses information by a relative difference between two DCT coefficient values embedded in a pair, comprising:
   a means for specifying a template to instruct on a block position used for a video when embedding the electronic watermark;
   a means for providing an electronic watermark editing bit to be newly embedded;
   a means for detecting a coefficient value pair bit embedded in the pair of DCT coefficient values of a block instructed by the template; and
   a means for comparing the detected coefficient value pair bit with the editing bit to be newly embedded and embedding the editing bit only when the detected coefficient value pair bit and the editing bit to be newly embedded are different.

2. The electronic watermark editor of a compressed video according to claim 1, wherein
   the means for specifying a template extracts DCT coefficient values while applying all templates to the video and judges, as an applied template, a template where a total sum of relative absolute value differences between pairs of the DCT coefficient values is maximized.

3. The electronic watermark editor of a compressed video according to claim 1, wherein
   the means for specifying a template selects the best match template for each video frame, where the template is chosen from all templates, so as to give largest value for a total sum of relative absolute value differences or relative square value differences between pairs of the DCT coefficient values.

4. A method of editing for an electronic watermark editor of a compressed video with an electronic watermark that expresses information by a relative difference between two DCT coefficient values embedded in a pair, said method comprising:

specifying a template to instruct on a block position used for a video when embedding the electronic watermark;

providing an electronic watermark editing bit to be newly embedded;

detecting a coefficient value pair bit embedded in the pair of DCT coefficient values of a block instructed by the template;

comparing the detected coefficient value pair bit with the editing bit to be newly embedded; and embedding the editing bit only when the detected coefficient value pair bit and the editing bit to be newly embedded are different.

5. The method according to claim 4, wherein said specifying extracts DCT coefficient values while applying all templates to the video and judges, as an applied template, a template where a total sum of relative absolute value differences between pairs of the DCT coefficient values is maximized.

6. The method according to claim 4, wherein said specifying selects the best match template for each video frame, where the template is chosen from all templates, so as to give largest value for a total sum of relative absolute value differences or relative square value differences between pairs of the DCT coefficient values.

* * * * *